INVENTOR.
Charles J. Helin
BY Henry Molz
ATTORNEY

Dec. 1, 1942.   C. J. HELIN   2,303,638
MAGNETIC TRANSMISSION OR CLUTCH
Filed Aug. 18, 1941   2 Sheets-Sheet 2

INVENTOR.
Charles J. Helin
BY Henry Molz
ATTORNEY

Patented Dec. 1, 1942

2,303,638

UNITED STATES PATENT OFFICE 2,303,638

MAGNETIC TRANSMISSION OR CLUTCH

Charles J. Helin, Burbank, Calif.

Application August 18, 1941, Serial No. 407,338

2 Claims. (Cl. 172—284)

The primary object of my invention is the provision of a magnetic transmission or clutch in which a variable speed driven member is efficiently impelled by a constant speed driving member.

A further object is the provision of a transmission having no axial movement of either the driving member or the driven member for effecting an operable connection between the said members.

A further object of the invention is the provision of a transmission having no physical connection between the driving member and the driven member other than an electrically induced force.

A further object of the invention is to provide a transmission in which a driven speed may be made to approach a positive or constant speed in relation to the driving speed without altering the transmission by simply connecting with suitable electrical controlling equipment.

A still further object is to provide a transmission which may be used as a clutch in which the driven member will pick up with a gradual or even acceleration and assure a smoothly, non-jerking performance for maximum power transmittal, although the current producing the induced force may be increased rapidly to the rated value of speed.

Other objects and advantages of the invention will more fully appear as this specification proceeds and as is set forth in the appended claims.

I attain these objects by the device described in the accompanying drawings, in which.

Figure 1:
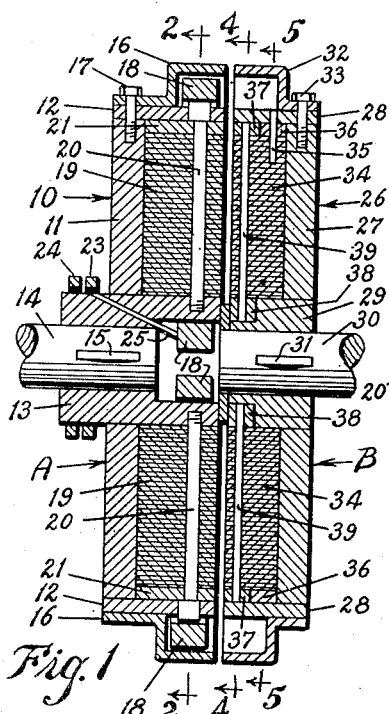
Figure 1 is a vertical section of the invention as on line 1—1 of Fig. 2 and Fig. 4.
Figure 2:
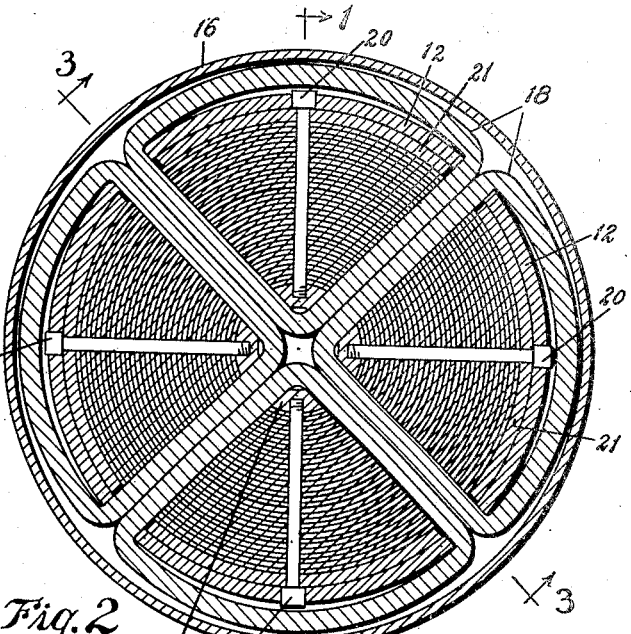
Figure 2 is a section on line 2—2 of Fig. 1.
Figure 3:
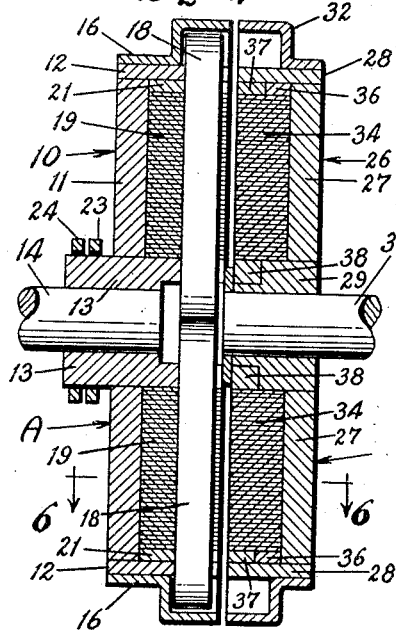
Figure 3 is a section on line 3—3 of Fig. 2 and Fig. 4.
Figure 4:
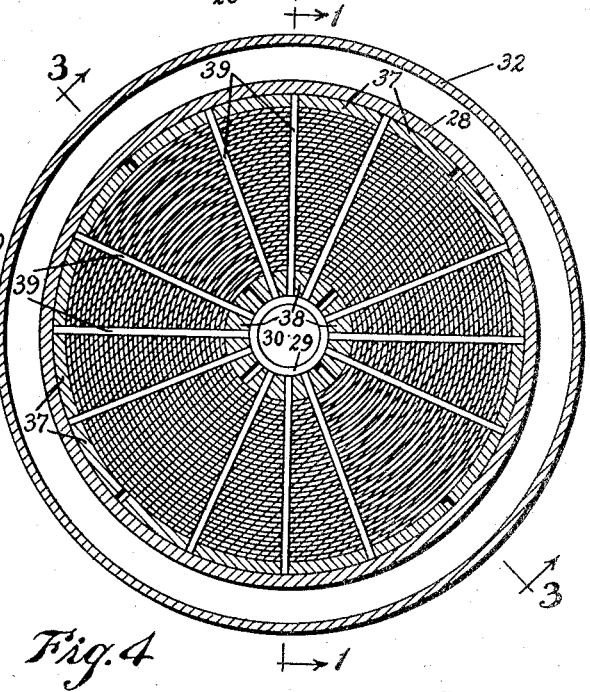
Figure 4 is a section on line 4—4 of Fig. 1.
Figure 5:
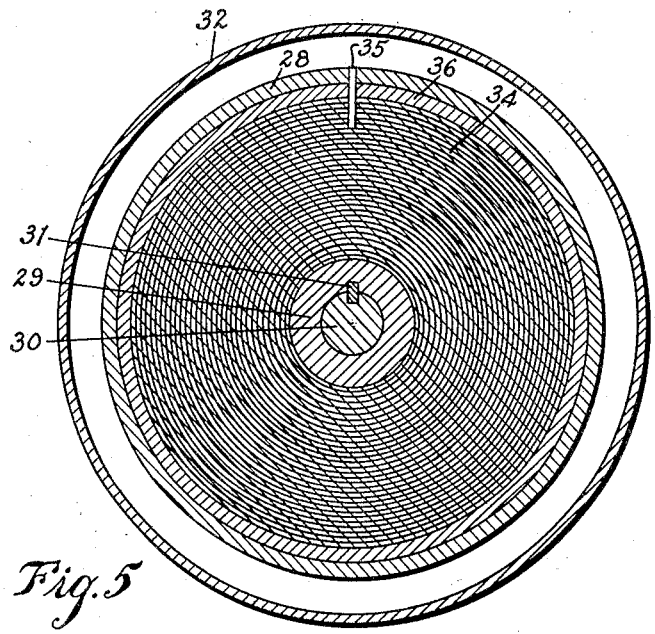
Figure 5 is a section on line 5—5 of Fig. 1.

Similar numerals and letters of reference refer to like parts throughout the several views, thus, the component parts of the invention comprise a driving member embodying a welded or otherwise formed frame 10 having a circular back or disk 11, a rim 12 and a hub 13 keyed to a driving shaft 14 as at 15.

A dust cover 16 may be attached by screws 17 or otherwise to the frame 10 for protection of a plurality of electrical windings 18 which form separate poles.

A continuous steel coil 19 is wound about the inner end of the hub 13 within the frame 10 like a tightly wound clock spring, and is rotated in unison with the hub 13 by attachment screws 20 having one end threaded into said hub and extending radially through the coil 19.

Arched segments 21 within the rim 12 are compressed against the coil 19 by the heads of the screws 20 to prevent loosening of the coil by vibration.

Figure 6:
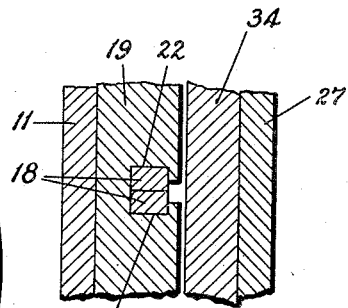
Figure 6 is a section on line 6—6 of Fig. 3.

The coil 19 is milled at 22 to receive the windings 18 as is shown best in Fig. 6.

A positive slip ring 23 and a negative slip ring 24 are positioned about the hub 13 to provide means for electrical current connection to the transmission.

A wire 25 represents the connection between the windings 18 and the slip ring 23.

A driven member embodying a welded or otherwise formed frame 26, having a back 27, a rim 28 and a hub 29 keyed to a driven shaft 30 as at 31 is provided; a dust cover 32 for attachment to the frame 26 by means of screws 33 may also be provided.

A continuous steel coil 34 is wound about the hub 30 and rotated with the frame 26 by means of one or more pins 35 connecting said coil with the rim 28.

An inner rim 36 encompassing the coil 34 is disposed between said coil 34 and said rim 28. The rim 36 does not cover the full width of the periphery of the coil 34, but space is provided for the disposition about said coil of a plurality of arched copper segments 37.

The inner end of the hub 29 is reduced in diameter to provide space for a plurality of arched copper segments 38 forming a core within the coil 34. The segment ends of the copper segments 37 and 38, are respectively slightly spaced, one from the other.

The coil 34 is drilled radially to receive a plurality of copper rods 39 adjacent the inner face of the driven member.

The segments 37 and 38 are radially drilled to receive the outer and inner ends respectively of said copper rods 39 to which they are soldered.

The coils 19 and 34 serve a purpose similar to the laminations in a conventional induction motor and the windings 18 serve as the field.

The operation of this invention resembles that of a conventional induction motor in which current is fed to the driving member (or field) only and not to the driven member (or armature) except that in this invention the driving member A is also capable of rotation by means of an external source (not shown).

The driving member A may be rotated without effecting a rotation of the driven member B if no current is fed to the driving member A, but if a direct voltage is applied to the windings 18 through the slip rings 23 and 24 a magnetic force will be applied to the copper segments 37 and 38 and the copper rods 39 thereby causing the driven member B to rotate in the same direction as the driving member A.

The speed of the driven member will vary more or less directly with the amount of current fed to the driving member until a maximum speed is reached. This maximum speed is determined by the saturation point of the iron in the coils and the number of copper arched segments, the greater the number of segments, the greater will be the slip speed between the driving and the driven member.

The maximum speed of the driven member will always be a small percentage less than that of the driving member, the percentage varying with the load. Consequently, with a source of speed applied to the driving member and speed from zero to the maximum may be obtained from the driven member.

The speed of the driven member will remain constant if the load remains constant, but will have drooping speed load characteristics. If, however, a form of controlling equipment be connected to the slip rings 23 and 24, such as the circuit shown in Fig. 7, the transmission may be made positive within the limits of said equipment.

Figure 7:
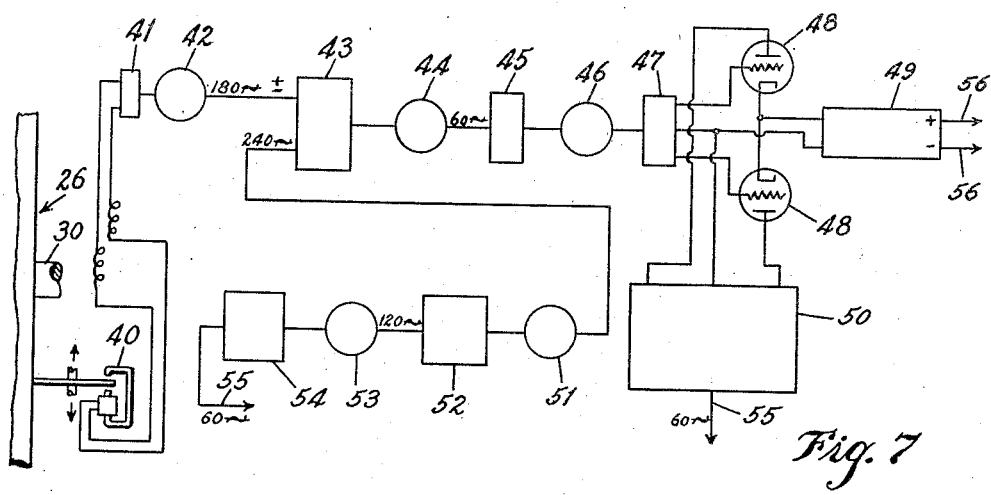
Figure 7 is a diagram of one form of proposed electrical equipment for the invention.

Since the transmission will operate without any controlling equipment, and since a number of different types of such equipment may readily serve the identical purposes, the equipment diagrammed in Fig. 7 is not necessarily a part of the invention, but is shown and described merely to facilitate the explanation of the effect of such an equipment in relation to the transmission.

The equipment shown includes an A. C. generator 40 frictionally driven from the frame 26 and adjustable as to speed by a movement toward or away from the shaft 30. Other components of the equipment connected to said generator 40. include a transformer 41, an amplifier 42, a mixing transformer 43, a detector 44, an interstage transformer 45, an amplifier 46, a coupling transformer 47, two grid controlled rectifiers 48, and a filter 49. Connected to the rectifiers 48 is a variable voltage power transformer 50 for main field current.

It also includes a doubler 51, an interstage transformer 52, a rectifier and doubler 53, and a power transformer 54, all connected to the transformer 43. Wires 55 lead to the source of A. C. power, and wires 56 provide an A. C. power connection to the slip rings 23 and 24.

The generator 40 controls the flow of current in the field of the driven member by controlling the grids of the two mercury-vapor grid controlled rectifiers 48 which supply the primary field current.

The function of the controlling equipment is to cause the value of the current flowing in the field windings 18 to vary inversely with the speed of the driven member B, i. e., if an increase of load were to occur the dropping of speed of the driven member B would, by reason of the decrease in speed of the generator 40, automatically cause an increase in the field current which would increase the magnetic force affecting the driven member, thereby pulling it back to its former place.

When the invention is used as a clutch, no controlling equipment is required.

It may readily be produced from materials obtained in the open market at no great cost, and, in operation, it provides a smoothly operating mechanism possessing a cushioning action, rendering maximum performance and practically trouble free.

I am aware that changes in construction of the device may from time to time readily suggest themselves, but within the scope herein set forth. Hence, I do not limit my present invention to the exact description of structure herein disclosd, but what I do claim is: :

1. In a magnetic transmission, a rotary driving member including a frame, a coiled magnetic core fixed in said frame having radially extending recesses in one face thereof, a plurality of coil windings having portions fitted in said recesses, and other portions circumscribing peripheral portions of said core which lie between said recesses, slip ring means for electrically connecting said coil windings with a source of electric current, a rotary driven member in axially spaced relation to the driving member including a frame, a coiled magnetic core fixed in the frame of the driven member in opposed relation to the core and coil windings of the driving member, circumferentially spaced copper segments at the center and periphery of said driven member core, and copper rods connecting the peripheral segments to the center segments and extending radially thru the core of the driven member.

2. In a magnetic transmission, a rotary driving member including a frame, a coiled magnetic core fixed in said frame having radially extending recesses in one face thereof, a plurality of coil windings having portions fitted in said recesses, and other portions circumscribing peripheral portions of said core which lie between said recesses, slip ring means for electrically connecting said coil windings with a source of electric current, a rotary driven member in axially spaced relation to the driving member including a frame, a coiled magnetic core fixed in the frame of the driven member in opposed relation to the core and coil windings of the driving member, circumferentially spaced copper segments at the center and periphery of said driven member core, copper rods connecting the peripheral segments to the center segments and extending radially thru the core of the driven member, said coil windings forming separate poles, said driving member frame including a rim and a hub, arcuate segments engaged with the periphery coiled core of the driving member and contacting said rim, and screw fastenings extending thru said rim, arcuate segments and core and threaded into said hub, there being four of said coil windings in circumferentially spaced relation in a common plane about the center of the core.

CHARLES J. HELIN.